US008484092B1

(12) United States Patent
Strand (10) Patent No.: US 8,484,092 B1
(45) Date of Patent: Jul. 9, 2013

(54) GENERATING COMMUNITIES BASED ON COMMON INTEREST

(75) Inventor: William Alexander Strand, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 353 days.

(21) Appl. No.: 12/793,908

(22) Filed: Jun. 4, 2010

(51) Int. Cl.
*G06Q 30/00* (2012.01)
(52) U.S. Cl.
USPC .......................................... 705/26.1
(58) Field of Classification Search
USPC ............................................. 705/26.1, 27.1
See application file for complete search history.

(56) References Cited

U.S. PATENT DOCUMENTS

| 2005/0203807 | A1* | 9/2005 | Bezos et al. ..................... 705/26 |
| 2010/0076951 | A1* | 3/2010 | Lyle et al. ..................... 707/706 |
| 2010/0144278 | A1* | 6/2010 | Vanharlingen et al. ......... 455/62 |
| 2010/0325127 | A1* | 12/2010 | Chaudhuri et al. ........... 707/759 |

OTHER PUBLICATIONS

Anonymous, " Government services administration features AllMeetings.com in travel training course," PR Newswire, Jan. 18, 2000, p. 1.*

* cited by examiner

*Primary Examiner* — Jeffrey A Smith
*Assistant Examiner* — Brandy A Zukanovich
(74) *Attorney, Agent, or Firm* — Thomas Horstemeyer, LLP (57) ABSTRACT

Disclosed are various embodiments for generating user communities based on common interests. Users demonstrating a potential interest in a product and/or product class in an electronic commerce system are identified. A geographic location of each of the users can also be identified. The geographic area can be expanded or reduced so that the pool of users in a community meets minimum and/or maximum thresholds. An event can be created on behalf of the users in an establishment. An electronic forum can also be created. The users in a community can also be linked together in a social networking system.

21 Claims, 5 Drawing Sheets

GENERATING COMMUNITIES BASED ON COMMON INTEREST

BACKGROUND

In an electronic commerce system various users may often browse and/or purchase the same or similar products. Additionally, users seeking a product in a particular product class may seek advice and/or input from other users regarding the product, product features, whether the product is appropriate for the needs of the user, etc. Users may also seek to form communities and/or relationships with other users having an interest in the same or similar products.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In the following discussion, a general description of the system and its components is provided, followed by a discussion of the operation of the same. This disclosure describes systems and methods for establishing user communities based at least upon a common interest. More specifically, the user communities share a product and/or product class as a common interest. In the context of this disclosure, a product can include a good, service or any combination thereof. Additionally, a user community, as described herein, can be constrained by a geographic location as well as time or other dimensions. As one example, a community of users can be made up of users who have purchased a product within the past thirty days who are also located in a particular neighborhood of a city. For the sake of convenience, first a networked environment is described, followed by a discussion of the operation of the various components of the data communications network according to various embodiments.

Figure 1:
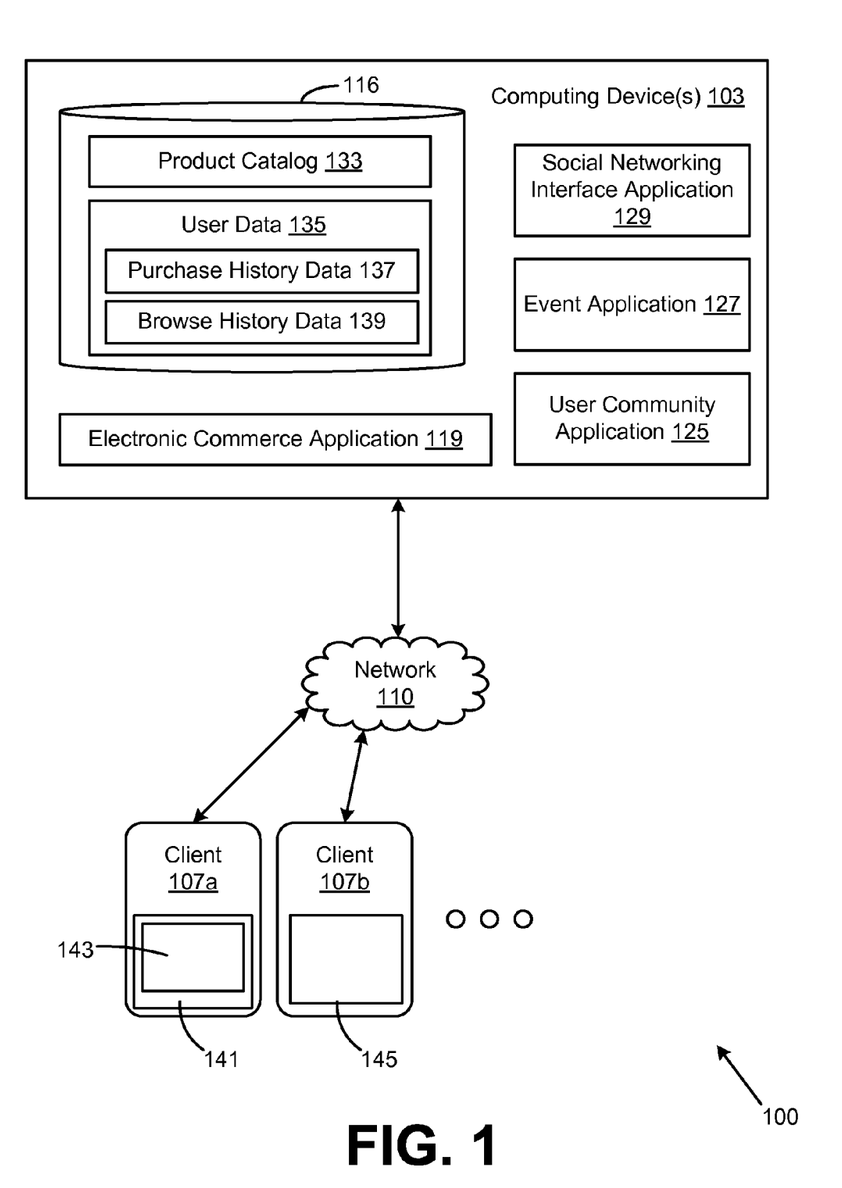
FIG. 1 is a drawing of networked environment according to various embodiments of the present disclosure.

With reference to FIG. 1, shown is an example of a networked environment 100 according to various embodiments. The networked environment 100 includes one or more computing devices 103 and/or clients 107 that can be in communication via the network 110. The network 110 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing devices 103 are referred to herein in the singular. Even though the term "computing device" is referred to in the singular, it is understood that a plurality of computing devices 103 may be employed in the various arrangements as described above.

The data stored in the data store 116 includes, for example, a product catalog 133 that includes a listing of various products that are available for browsing and/or purchasing within via the electronic commerce application 119. The products in the product catalog 133 of the data store 116 can also be associated with various product data, which can include stock keeping unit (SKU) identifiers, model numbers, serial numbers, product attributes, product descriptions, other products with which the product is associated, etc. Additionally, the product data in a product catalog 133 can include entries that identify a product class and/or hierarchy in which a product can be classified.

The data store 116 can also include user data 135, which stores information about users of an electronic commerce system implemented by the electronic commerce application 119. In some embodiments, each user can be associated with a user profile that can contain additional data about the user, such as a geographic location, product interests, a product wish list, etc. In addition, the user data 135 can also include purchase history data 137. The user data 135 can further include data that tracks the interaction of users with an electronic commerce system and/or the electronic commerce application 119. To this end, the user data 135 can include purchase history data 137 that lists each of the purchases made by users through via the electronic commerce application 119. Also, the user data 135 includes browse history data 139 that sets forth the browsing activity of customers when they visit an electronic commerce system implemented by the electronic commerce application 119. The browse history data 139 includes data indicating how a user has navigated through an electronic commerce system and the products or communities in which a user has viewed and/or expressed an interest.

The components executed on the computing device 103, for example, include an electronic commerce application 119, a user community application 125, an event application 127, a social networking interface application 129 as well as other applications, services, processes, systems, engines, or functionality not discussed in detail herein. The electronic commerce application 119 is executed in order to facilitate the online viewing and/or purchase of items and products over the network 113. The electronic commerce application 119 can also facilitate shipment and/or delivery of products to a customer from a fulfillment center or the like. The electronic commerce application 119 also performs various backend functions associated with the online presence of a merchant in order to facilitate the online purchase of items as will be described. For example, the electronic commerce application 119 generates network pages, such as web pages or other types of network content, that are provided to client devices 107 in response to requests for the purposes of viewing and selecting products for purchase, rental, download, lease, or other form of consumption and to perform other tasks as will be described.

The user community application 125 is also executed in the computing device 103 to facilitate the creation of user communities that are based on a common interest. In the case of an electronic commerce system implemented by the computing device 103, the user communities created by the user community application 125 are based on an interest in a product available via the electronic commerce system. The user community application 125 can also create user communities among users in a particular geographic area, within a social networking system, and/or an electronic forum, as will be described in further detail herein. The user community application 125 can also facilitate creating events or gatherings for the users within a community.

The event application 127 is executed in the computing device 103 to facilitate the creation of events or gatherings on behalf of users within a community in conjunction with the user community application 125. Once a community is generated by the user community application 125, the event application 127 can generate a time and/or venue for a gathering, as well as communicate with an establishment that can potentially host such a gathering. The social networking interface application 129 is executed in the computing device 103 to facilitate the linking of user communities created by the user community application 125 in a social networking system, as will be described in further detail herein.

The client 107 is representative of a plurality of client devices that may be coupled to the network 110. The client 107 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 107a may be configured to execute various applications such as a browser 141 and/or other applications. The browser 117 may be executed in a client 107a, for example, to access and render network pages 143, such as web pages, or other network content served up by the computing device 103 and/or other servers. The client 107a may be configured to execute applications beyond the browser 141 such as, for example, email applications, instant message applications, social networking applications, and/or other applications. The client 107 can also include additional special purpose hardware and software components with which a browser 141 or other software executed on the client 107 may interact.

As one non-limiting example, the client 107a may comprise a mobile device including cellular telephone, location detection hardware, and software components. Accordingly, the mobile device client 107a can detect the location of a user using the client 107a, which can be incorporated into various location based services and applications executed thereon. In one embodiment, the user community application 125 can utilize location based services and applications executed on a client 107 to provide location based features and/or services in the context of this disclosure. The client 107b can also include a special purpose application 145 tailored to interact with the electronic commerce application 119. As one example, the client 107b can comprise a mobile device with a dedicated application configured to allow a user to interact with the electronic commerce application 119 with client side code that enhances a user experience by providing more complex user interface elements and other functionality. For example, the special purpose application 145 can facilitate the providing of location based services in conjunction with the user community application 125 by providing access to the location based services provided in the client 107b hardware.

Next, a general description that provides one example of the operation of the various components of the networked environment 100 is provided. The electronic commerce application 119 can allow a user on a client 107 to view, browse, and/or purchase products. In embodiments of this disclosure, the user community application 125 can allow a user to join a community based upon a common interest. In the depicted embodiment, the user can join a community based upon an interest in a particular product or a class of product. A user can express an interest in a product and/or product class by viewing and/or purchasing a product and/or product class via the electronic commerce application 119. By way of a non-limiting illustration, a product can include a particular book title, and a product class can include a genre or series with which the book is associated.

Accordingly, when a user on a client 107 submits a request to the electronic commerce application 119 to view and/or purchase a product from the product catalog 133, the user community application 125 can transmit a request to the user to determine whether the user has interest in joining a community of other users that have an interest in the product the user has viewed and/or purchased. In other embodiments, a user on a client 107 may have to submit an affirmative request to the user community application 125 to join a community. Therefore, in some embodiments of the disclosure, a user community can include a plurality of users who may have an interest in a product or product class. In this sense, a user community can have a product constraint. In other words, various user communities can be separated on the basis of an interest in a product or product class.

In one embodiment, the user community application 125 can detect the interest of a user in a particular product and/or product class by accessing the purchase history data 137 associated with the user. If a user has purchased a particular product or one from a product class on which a user community is based, the user community application 125 can designate the user as a potential member of a user community sharing an interest in the product or product class. In this way, a user can be placed or invited into a particular user community based on a previous purchase of the product rather than a present purchase and/or viewing of the product via the electronic commerce system. Additionally, the user community application 125 can detect an interest of a user in a particular product and/or product class by accessing the browse history data 139 associated with the user. If a user has viewed or browsed a particular product or within a particular product class on which a user community is based, the user community application 125 can designate the user as a potential member of a user community sharing an interest in the product or product class.

A user community according to an embodiment of this disclosure can also be constrained on the basis of a geographic location. In other words, the user community application 125 can create communities of users of an electronic commerce system, implemented by the electronic commerce application 119, who share a common interest in a product and who are also located or associated with a particular geographic area. Therefore, in one example, the user community application 125 can create a community of users who have purchased a particular book via the electronic commerce application 119 and who are also located within a particular city and/or neighborhood. In one embodiment, the user community application 125 can retrieve a geographic location associated with a user profile from the user data 135 in the data store 116 in order to determine a geographic location of a user. In other embodiments, the user community application 125 can determine a location of a client 107 on which a user is accessing the electronic commerce application 119 and/or user community application 125. As one example, a user accessing the electronic commerce application 119 on a mobile device with global positioning system (GPS) capabilities can be located with the GPS services available on the client 107, and a geographic location of a present location of the user can be determined.

Accordingly, if the user community application 125 identifies more users in a particular geographic area than are specified by a threshold limiting a maximum size of a user community of a particular product or product class, the user community application 125 can reduce the geographic area from which users are grouped into the community. By reducing the size of the geographic area, the user community application 125 reduces the pool of users from which users in a community are pulled.

In an alternative example, if the user community application 125 identifies fewer users in a particular geographic area than are specified by a threshold setting a minimum number of users in a user community or fewer users than are specified by the maximum threshold, the user community application 125 can expand the size of the geographic area from which users are grouped into the community. In other embodiments, the user community application 125 can determine a size of the geographic location by a population density of a particular region and/or location. In this way, the user community application 125 can create user communities of an optimal size to encourage user participation in the community.

As an alternative embodiment, instead of grouping users sharing a product interest into communities on the basis of a geographic area, the user community application 125 can also group users into communities based on a temporal component of the user's interest in a product or product class. In other words, the user community application 125 can form a user community by grouping users who have purchased and/or viewed a product in the product catalog 133 in a similar time period. In one example, if an interest shared by a group of users is related to a videogame application, it may be desirable to group users who have purchased the product in a similar time period into a user community in an attempt to form a user community comprised of users having a similar skill level or experience level. As another example, although a user purchased a particular product on which a community is based, the user may no longer have a strong interest in the product if the user purchased the product in the distant past, and a stronger community can be formed among users who have recently purchased and/or viewed the product via the electronic commerce application 119.

Users can also be grouped into communities along other dimensions, such as age, experience level, and other aspects of a user as can be appreciated. As a non-limiting example, a user may be identified as being associated with a product, but the user may wish to join a user community associated with a product that contains other users of a similar or a particular age group. Accordingly, the user community application 125 can group users according to these other dimensions in addition to product interest.

Upon identifying a group of users from which to form a community, the user community application 125 can then generate an electronic forum in which the users can communicate. In one embodiment, the electronic forum can comprise a message board in which the users can interact. In other embodiments, the electronic forum can comprise a mailing list or other means of communicating among the community. In addition to generating an electronic forum in which the users in a community can interact, the user community application 125 and/or social networking interface application 129 can link the users of a community together in a social networking system. The social networking interface application 129 can interact with an external social networking system and link the users in a community generated by the user community application 125 together.

As one example, the social networking interface application 129 can form a group within a social network system on behalf of the users in a community and invite the users into the group. As another example, the social networking interface application 129 can provide each user in a community created by the user community application 125 with a link to a profile in the social networking system of the other users in the community. The social networking interface application 129 can also interact with the social networking system to link the users of the community together as "friends" or other create other associations between the users, as provided in the social networking system. In other embodiments, the user community application 125 can facilitate the giving and receiving of product advice. Accordingly, the user community application 125 can allow a user in a community to designate himself as willing to assist other users in the community with regard to a product, and the members of the community can interact in this context. In other embodiments, the user community application 125 can perform a location based search of a corpus of reviews and allow a user to find user opinions regarding a product from other users who are similarly located.

The user community application 125 and/or event application 127 can generate and/or facilitate events or gatherings on behalf of a user community created by the user community application 125. In one embodiment, the event application 127 can generate a notification transmitted to the users in a community that a gathering of users in a community has been initiated. Accordingly, the event application 127 can notify the community of a particular time and place in which a gathering will occur. As one example, the event application 127 can specify a particular establishment in which the gathering will occur. An establishment can include a third party location, venue, etc., in which the users can interact with one another in person. As some non-limiting examples, the event application 127 can specify a coffee shop, restaurant, or other establishments as can be appreciated.

The event application 127 can also communicate with an establishment on behalf of users to facilitate the gathering. In one example, the event application 127 can notify a particular establishment that a particular user community gathering will occur in the establishment. Accordingly, as such a gathering may have some value to an establishment because of the ancillary business that may result, the event application 127 can also communicate with the establishment on behalf of a user community to facilitate negotiating of deals, discounts, etc., that can be offered to the user community as an incentive to conduct and/or attend the gathering. As an additional example, the event application 127 can facilitate collection of a fee from the establishment as compensation for designating the establishment as the venue for a gathering generated by the event application 127 for a community created by the user community application 125.

Figure 2:
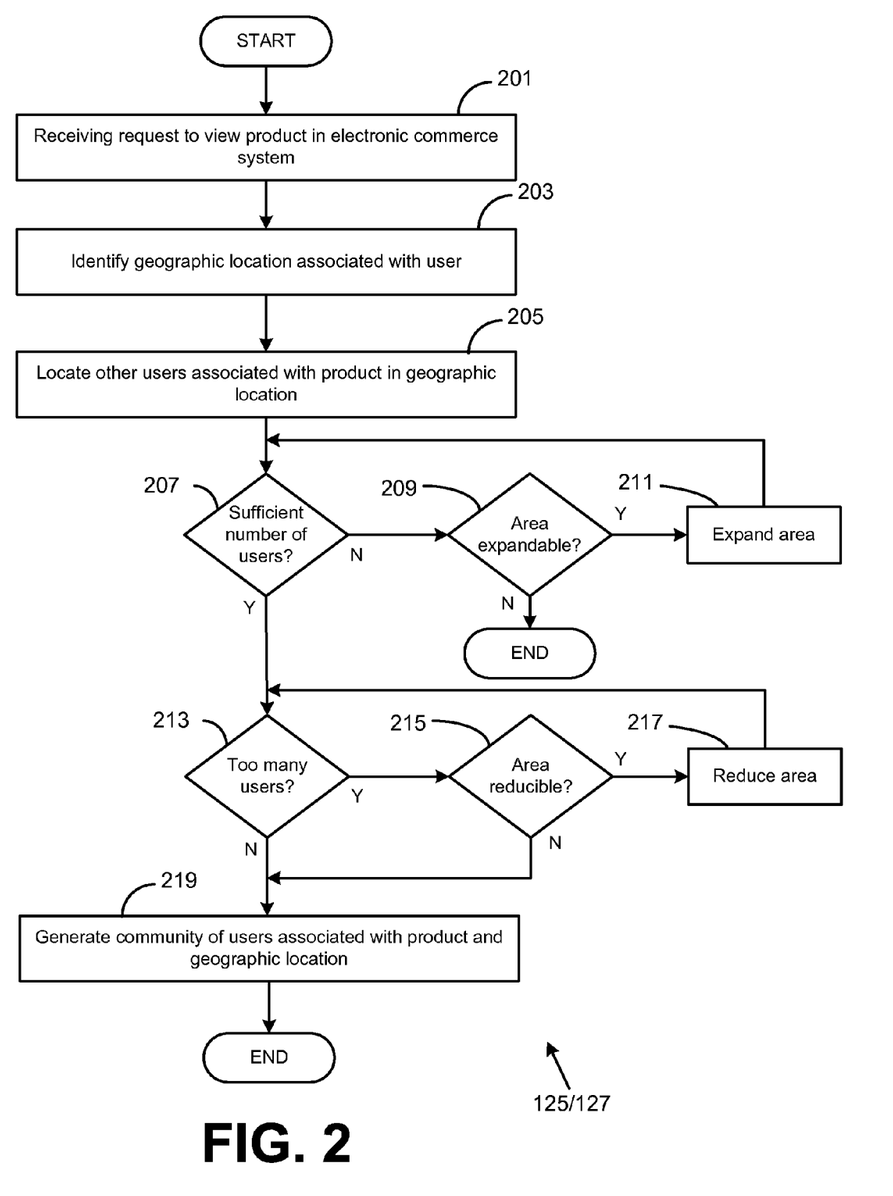
FIG. 2 is a flowchart illustrating one example of functionality of the user community application as executed in a computing device in the networked environment of FIG. 1 according to various embodiments of the present disclosure.

Referring next to FIG. 2, shown is a flowchart that provides one example of the operation of a portion of the user community application 125 and/or event application 127 according to various embodiments. It is understood that the flowchart of FIG. 2 provides merely an example of the many different types of functional arrangements that may be employed to implement the operation of the portion of the user community application 125 and/or event application 127 to generate a user community as described herein. As an alternative, the flowchart of FIG. 2 may be viewed as depicting an example of steps of a method implemented in the computing device 103 (FIG. 1) according to one or more embodiments.

First, in box 201, a request to view a product and/or product class in an electronic commerce system is received from a user on a client 107, and in box 203, a geographic area associated with the user is determined. As noted above, a geographic location of the user can be determined by retrieving a location in a user profile, from location positioning capabilities of the client 107, and/or by determining a location of a network from which the user accesses the electronic commerce application 119 or user community application 125.

In box 205, the user community application 125 can locate other users associated with the product and/or product class who are associated with a location that is within or near the geographic area identified by the user community application 125 in box 203. In box 207, the user community application 125 determines whether there are a sufficient number of users associated with the geographic area to form a user community. As noted above, the user community application 125 can include minimum and/or maximum size thresholds for forming a user community, and if there is an insufficient number of users identified as having association with a particular product to join a user community, the user community application 125 determines whether the geographic area is expandable in box 209. If the geographic area is expandable, the user community application 125 expands the geographic area in box 209. The user community application 125 expands the geographic area to increase the number of users available to join a user community in order to meet a minimum size threshold.

If a minimum number of users to form a user community are located, in box 213, the user community application 125 determines whether the number of users in the geographic area exceeds a maximum threshold. If the number of users exceeds such a threshold, then in box 215 the user community application 125 determines whether the geographic area is reducible. If the area is reducible, then in box 217 the geographic area from which users are pulled to form a community is reduced, and the user community application 125 again determines whether the maximum threshold is exceeded in box 213. Next, in box 219 the user community application 125 generates a user community associated with a product and/or product class as well as a geographic location. Accordingly, an event application 127 can generate events or gatherings on behalf of the user community and/or the social networking interface application 129 can then link the users together in a social networking system. The user community application 125 can also facilitate the sharing of product advice or other interaction among the users in a community as described herein.

Figure 3:
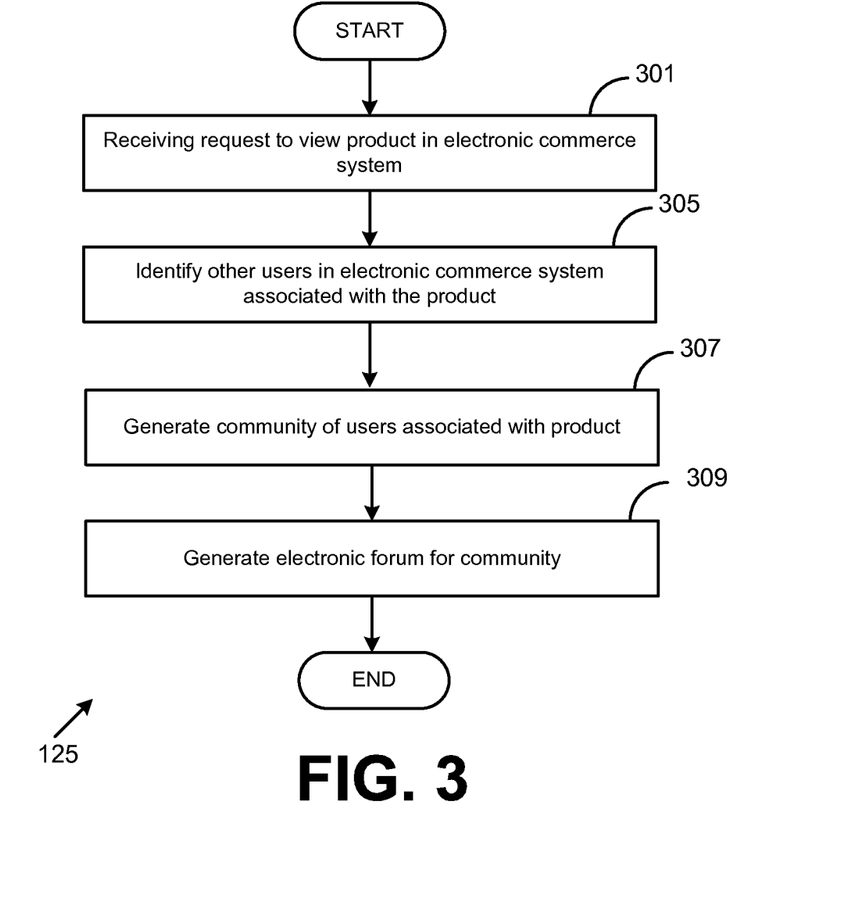
FIG. 3 is a flowchart illustrating one example of functionality of the user community application as executed in a computing device in the networked environment of FIG. 1 according to various embodiments of the present disclosure.

Referring next to FIG. 3, shown is a flowchart that provides one example of the operation of a portion of the user community application 125 according to various embodiments. It is understood that the flowchart of FIG. 3 provides merely an example of the many different types of functional arrangements that may be employed to implement the operation of the portion of the user community application 125 to generate a user community as described herein. As an alternative, the flowchart of FIG. 3 may be viewed as depicting an example of steps of a method implemented in the computing device 103 (FIG. 1) according to one or more embodiments.

First, in box 301, a request to view and/or purchase a product and/or product class in an electronic commerce system is received from a user on a client 107, and in box 303, other users in the electronic commerce system associated with the product and/or product class are identified. In box 305, a user community of users who are associated with the product and/or product class is generated. As described herein, a user can be considered to be associated with a product and/or product class if the user community application 125 can detect an interest in a product and/or product class or if the user expresses such an interest. As an additional example, if a user has authored a product review in a corpus of product reviews in an electronic commerce system, the user can be considered to have an association with the product. As yet another example, if the user adds a particular product to a wish list in a user profile, the user can also be considered as having an association with the product. In box 307, the user community application 125 can generate an electronic forum in which the user community can interact.

Figure 4:
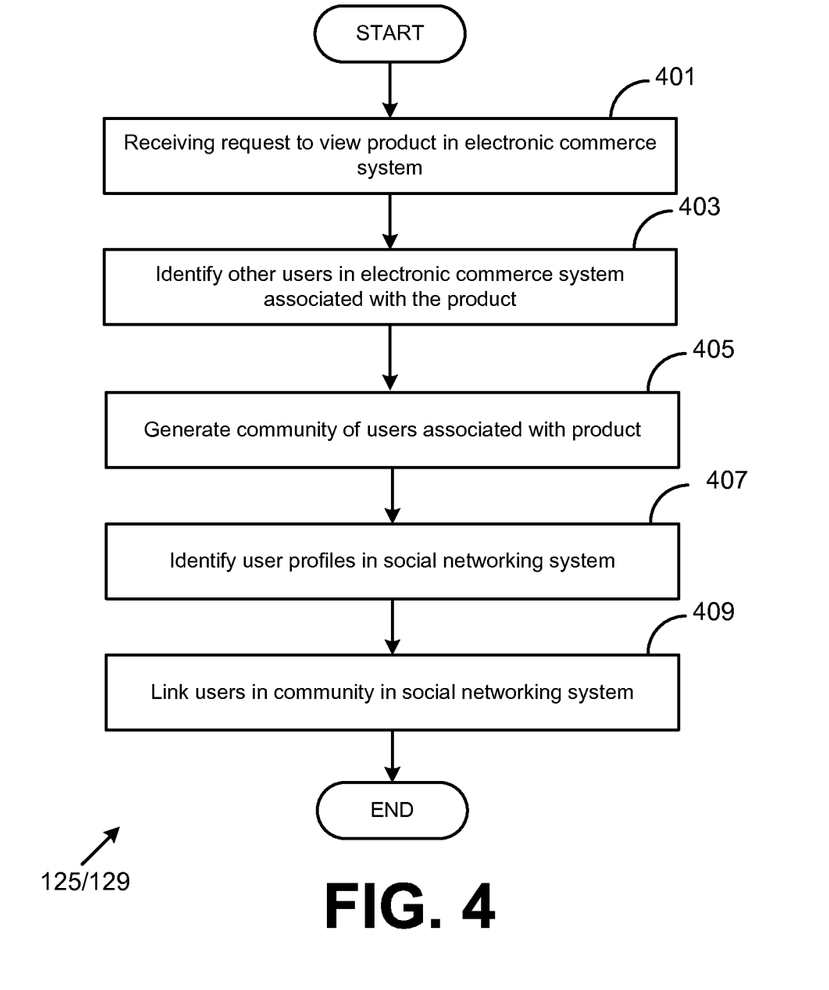
FIG. 4 is a flowchart illustrating one example of functionality of the user community application as executed in a computing device in the networked environment of FIG. 1 according to various embodiments of the present disclosure.

Referring next to FIG. 4, shown is a flowchart that provides one example of the operation of a portion of the user community application 125 and/or social networking interface application 129 according to various embodiments. It is understood that the flowchart of FIG. 4 provides merely an example of the many different types of functional arrangements that may be employed to implement the operation of the portion of the user community application 125 and/or social networking interface application 129 to generate a user community as described herein. As an alternative, the flowchart of FIG. 4 may be viewed as depicting an example of steps of a method implemented in the computing device 103 (FIG. 1) according to one or more embodiments.

First, in box 401 a request to view a product and/or product class in an electronic commerce system is received from a user on a client 107, and in box 403, other users in the electronic commerce system associated with the product and/or product class are identified. In box 405, a user community of users who are associated with the product and/or product class is generated. In box 407, the social networking interface application 129 can identify profiles associated with members of the community in the social networking system, and in box 409, the users of the community can be linked together in the social networking system as described above.

Figure 5:
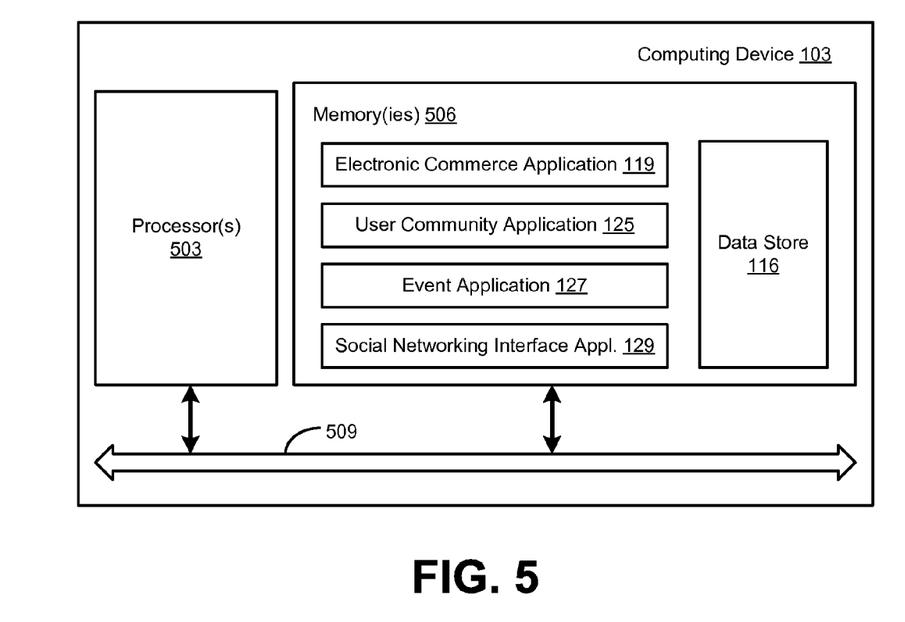
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 (FIG. 1) according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are an electronic commerce application 119 (FIG. 1), user community application 125 (FIG. 1), event application 127 (FIG. 1), social networking interface application 129 (FIG. 1), and potentially other applications. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 110 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce application 119 (FIG. 1), user community application 125 (FIG. 1), event application 127 (FIG. 1), social networking interface application 129 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIG. 2-4 shows the functionality and operation of an implementation of portions of the electronic commerce application 119 (FIG. 1), user community application 125 (FIG. 1), event application 127 (FIG. 1) and/or social networking interface application 129 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIG. 2-4 show a specific order of execution, it is understood that the order of execution may differ from that which is depicted. For example, the order of execution of two or more blocks may be scrambled relative to the order shown. Also, two or more blocks shown in succession in FIG. 2-4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 119 (FIG. 1), user community application 125 (FIG. 1), event application 127 (FIG. 1) and/or social networking interface application 129 (FIG. 1), that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system.

In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs.

Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, comprising:
    code that receives a request from a user on a client to view a product available in an electronic commerce system;
    code that identifies a plurality of users associated with the product by extracting at least one of a purchasing history or a browsing history associated with each of the users from a data store and identifies users having at least one of the purchasing history or the browsing history that contains at least one of: the product or a different product from a product class associated with the product;
    code that identifies a subset of the plurality of users associated with product and located within a geographic location;
    code that identifies whether a number of the subset of the users associated with the product and located within the geographic location exceeds a predefined threshold, a size of the geographic location being expanded if the number of the subset of the users within the geographic location is less than the predefined threshold and the size of geographic location being reduced if the number of the subset of the users within the geographic location is more than a predefined maximum threshold;
    code that generates a community facilitating communication among the user and the subset of the users;
    code that generates an invitation for a gathering for the user and the subset of the users, the invitation for the gathering designating a time and an establishment at which the gathering will occur; and
    code that transmits an offer to the establishment on behalf of the user and the identified subset of the users to designate the gathering to occur at the establishment.

2. A system, comprising:
    at least one computing device; and
    a user community application executed in the at least one computing device, the user community application comprising:
        logic that receives a request from a user on a client to view a product available in an electronic commerce system;
        logic that identifies a plurality of users associated with the product;
        logic that identifies a geographic location associated with the user;
        logic that identifies a subset of the users associated with the product that are located within the geographic location associated with the user;
        logic that generates a community facilitating interaction among the user and the identified subset of users;
        logic that generates a gathering for the user and the identified subset of the users, the gathering further comprising a time and a location of an establishment; and
        logic that transmits an offer to the establishment on behalf of the user and the identified subset of the users to designate the gathering to occur at the at least one establishment.

3. The system of claim 2, wherein the logic that generates the community further comprises logic that generates an electronic forum in which the user and the subset of users can interact.

4. The system of claim 2, wherein the logic that generates the community further comprises logic that links the user and the subset of the users in a social networking system.

5. The system of claim 2, wherein the logic that identifies the geographic location associated with the user further comprises logic that receives a global positioning system (GPS) location of the user from the client associated with the user.

6. The system of claim 2, further comprising logic that determines a size of the geographic location based at least upon a population density of the geographic location.

7. The system of claim 2, further comprising logic that determines a size of the geographic location based at least upon a number of users associated with the product within the geographic location.

8. The system of claim 7, further comprising logic that expands the size of the geographic location when the number of users within the geographic location is less than a predefined threshold.

9. The system of claim 2, wherein the logic that identifies a plurality of users associated with the product further comprises logic that identifies a plurality of users associated with a product class associated with the product.

10. The system of claim 2, wherein the logic that identifies a plurality of users associated with the product further comprises:
    logic that extracts at least one of a purchasing history or a browsing history associated with each of the users; and
    logic that identifies users having at least one of the purchasing history or the browsing history that contains at least one of: the product or a different product from a product class associated with the product.

11. The system of claim 2, further comprising:
    logic that identifies a preexisting user community associated with the product and the user community; and
    logic that places the user in the preexisting user community.

12. A method, comprising the steps of:
    receiving, in at least one computing device, a request from a user on a client to view a product available in an electronic commerce system;
    identifying, in the at least one computing device, a plurality of users associated with the product;
    identifying, in the at least one computing device, a geographic location associated with the user;
    identifying, in the at least one computing device, a subset of the users associated with the geographic location;
    generating, in the at least one computing device, a community facilitating interaction among the user and the subset of the users;
    generating, in the at least one computing device, a gathering for the community, the gathering comprising a time and a location of an establishment;

transmitting, via the at least one computing device, an offer to the establishment on behalf of the user and the identified subset of the users to designate the gathering to occur at the at least one establishment; and collecting, via the at least one computing device, a fee from the establishment as compensation for selection of the establishment for the gathering.

13. The method of claim 12, wherein the step of generating the community further comprises the step of generating, in the at least one computing device, an electronic forum in which the user and the subset of users can interact.

14. The method of claim 12, wherein the step of generating the community further comprises the step of linking together, in the at least one computing device, the user and the subset of the users in a social networking system.

15. The method of claim 12, wherein the step of identifying a geographic location associated with the user further comprises receiving a global positioning system (GPS) location of the user.

16. The method of claim 12, further comprising the step of determining a size of geographic location based at least upon a population density of the geographic location.

17. The method of claim 12, further comprising the step of determining a size of the geographic location based at least upon a reach of the product.

18. The method of claim 17, wherein the reach of the product is determined by identifying whether a number of the users associated with the product within the geographic location exceeds a predefined threshold.

19. The method of claim 18, further comprising the step of expanding the size of the geographic location when the number of users within the geographic location is less than the predefined threshold.

20. The method of claim 12, wherein the step of identifying a plurality of users associated with the product further comprises identifying a plurality of users associated with a product class associated with the product.

21. The method of claim 12, wherein the step of identifying a plurality of users associated with the product further comprises the steps of:

extracting at least one of a purchasing history or a browsing history associated with each of the users from the data store;

identifying users having at least one of the purchasing history or the browsing history that contains at least one of: the product or a different product from a product class associated with the product.

\* \* \* \* \*

UNITED STATES PATENT AND TRADEMARK OFFICE
CERTIFICATE OF CORRECTION

PATENT NO. : 8,484,092 B1  
APPLICATION NO. : 12/793908  
DATED : July 9, 2013  
INVENTOR(S) : William Alexander Strand Page 1 of 1

It is certified that error appears in the above-identified patent and that said Letters Patent is hereby corrected as shown below:

In the Claims

Claim 1, column 11, line 28, insert the word --the-- before "users";

Claim 1, column 11, line 33, insert the word --the-- before "product";

Claim 1, column 11, line 41, insert the word --the-- before "geographic";

Claim 16, column 13, line 20, insert the word --the-- before "geographic".

Signed and Sealed this  
Thirtieth Day of September, 2014

Michelle K. Lee  
*Deputy Director of the United States Patent and Trademark Office*